United States Patent
Zeiner et al.

[11] Patent Number: 6,074,018
[45] Date of Patent: Jun. 13, 2000

[54] MOTOR VEHICLE BRAKING SYSTEM WITH AND TRACTION CONTROL AND/OR MOVEMENT DYNAMICS REGULATING DEVICE

[75] Inventors: Peter Zeiner, Stuttgart; Jurgen Breitenbacher, Winterbach; Hans-Jorg Wolff, Schorndorf; Rainer Heinsohn, Tamm; Andreas Klug, Leonberg; Hermann Kaess, Markgroningen; Karl-Heinz Willmann, Freiberg, all of Germany

[73] Assignee: Robert Bosch GmbH, Stuttgart, Germany

[21] Appl. No.: 09/091,991

[22] PCT Filed: Sep. 24, 1997

[86] PCT No.: PCT/DE97/02159

§ 371 Date: Aug. 14, 1998

§ 102(e) Date: Aug. 14, 1998

[87] PCT Pub. No.: WO98/18665

PCT Pub. Date: May 7, 1998

[30] Foreign Application Priority Data

Oct. 29, 1996 [DE] Germany ............. 1 96 44 883

[51] Int. Cl.[7] ............................................. B60T 8/32
[52] U.S. Cl. ............... 303/116.1; 303/10; 303/113.1; 303/116.4; 303/113.2
[58] Field of Search ............... 303/113.2, 116.1, 303/116.2, 116.3, 116.4, 10–12, 68, DIG. 1, DIG. 2, 900, 901, 113.1, 119.1, 119.2

[56] References Cited

U.S. PATENT DOCUMENTS

| | | | |
|---|---|---|---|
| 4,580,848 | 4/1986 | Widmer | 303/119.1 |
| 4,875,741 | 10/1989 | Ozawa et al. | 303/116.1 |
| 4,952,002 | 8/1990 | Arikawa et al. | 303/116.1 |
| 4,969,696 | 11/1990 | Yogo et al. | 303/116.1 |
| 5,046,788 | 9/1991 | Lindenman | 303/116.1 |
| 5,167,442 | 12/1992 | Alaze et al. | 303/116.1 |
| 5,242,216 | 9/1993 | Miyawaki et al. | 188/181 A |
| 5,261,731 | 11/1993 | Yogo et al. | 303/116.1 |
| 5,277,483 | 1/1994 | Yosida et al. | |
| 5,393,132 | 2/1995 | Yogo et al. | 303/119.2 |
| 5,441,336 | 8/1995 | Takeuchi | 302/116.1 |

FOREIGN PATENT DOCUMENTS

| | | |
|---|---|---|
| 4213740 | 10/1993 | Germany . |
| 4431474 | 3/1996 | Germany . |
| 9613418 | 5/1996 | WIPO . |

OTHER PUBLICATIONS

Patent Abstracts of Japan, vol. 14, No. 545 (M–1054) Dec. 4, 1990 and JP 02–231256A Sep. 13, 1990.

*Primary Examiner*—Douglas C. Butler
*Attorney, Agent, or Firm*—Ronald E. Greigg; Edwin E. Greigg

[57] ABSTRACT

The invention is based on a dual-circuit anti-lock vehicle brake system (10) with a tandem master cylinder (12), a switchover valve (14) following the latter, a brake pressure modulation valve assembly (18, 20) that has a brake pressure buildup valve (18) and a brake pressure reduction valve (20) for each wheel brake cylinder (16), and a return pump (24). To enable building up brake pressure rapidly for vehicle dynamics control, the invention proposes one additional pump (28) in each brake circuit (I, II), whose intake side is connected directly to the master cylinder (12) and which feeds in the direction of the wheel brake cylinders (16) connected to to this brake circuit (I, II). As a result, a brake pressure buildup is possible in each wheel brake cylinder (16), even when the master cylinder (12) is not actuated, which buildup can be modulated for individual wheels in a manner known per se.

8 Claims, 3 Drawing Sheets

MOTOR VEHICLE BRAKING SYSTEM WITH AND TRACTION CONTROL AND/OR MOVEMENT DYNAMICS REGULATING DEVICE

PRIOR ART

The invention relates to a hydraulic vehicle brake system with an arrangement for traction control and/or vehicle dynamics control and with two or more brake circuits.

One such vehicle brake system with two brake circuits, known from German Patent DE 42 32 311 C1, has a tandem master cylinder, which by means of a switchover valve downstream of the master cylinder can be disconnected from the other hydraulic elements. The known vehicle brake system also has a brake pressure modulation valve assembly, with a brake pressure buildup valve and a brake pressure reduction valve for brake pressure modulation in each wheel brake cylinder. With a return pump, brake fluid that has flowed out of the wheel brake cylinder is fed in the direction of the master cylinder or back into the wheel brake cylinders.

To enable building up brake pressure when the master cylinder is not actuated, for the sake of traction control, the known vehicle brake system has an intake valve, by which an intake side of the return pump communicates with the master cylinder. However, this has the disadvantage that the intake valve acts as a throttle and thus delays the brake pressure buildup. However, such a delayed brake pressure buildup, for vehicle dynamics control or in other words stabilization of the vehicle, especially in fast cornering, by purposeful braking of individual vehicle wheels to prevent skidding, is unacceptable, since the vehicle is already skidding before the vehicle dynamics control becomes operative.

The known vehicle brake system therefore has a precharge pump, to which brake fluid is aspirated from a supply container of the master cylinder and is carried to the two brake circuits via special hydraulic components, known as plungers. Through the intake valves, the brake fluid, aspirated from the container by the precharge pump, flows to the intake side of the return pump. The plungers are necessary first in order to disconnect the master cylinder hydraulically from the brake circuits when the precharge pump is in operation. Otherwise the brake fluid would flow from the precharge pump through the unactuated master cylinder into the supply container thereof. Second, the plungers are necessary in order to keep the two brake circuits hydraulically separated from one another. The plungers are complicated and hence expensive hydraulic components. Another disadvantage is that the plungers communicate hydraulically with the respectively other brake circuit. If one of the two plungers is defective, this can mean that the two brake circuits communicate with one another hydraulically, which if there is a leak in one brake circuit for instance causes a failure of the entire vehicle brake system. It is critical to disconnect the two brake circuits, from the standpoint of functional safety of the vehicle brake system.

ADVANTAGES OF THE INVENTION

The vehicle brake system according to the invention has an additional pump in each brake circuit for generating brake pressure; this pump is connected directly to the master cylinder. Between an intake side of the additional pump and the master cylinder, there are no hydraulic components that would act as throttles and thereby delay the brake pressure buildup. The invention has the advantage of a rapid brake pressure buildup when the master cylinder is not actuated, which is advantageous at least for the sake of traction control and is indispensable for vehicle dynamics control. Another advantage of connecting the additional pump to the master cylinder is that no additional intake line to a brake fluid container and no additional connection to the brake fluid container is necessary, a connection that would require a modified brake fluid container. Another advantage of the invention is that each vehicle wheel can be braked when the master cylinder is not actuated. This is a necessity for traction control if driven vehicle wheels are assigned to different brake circuits. For vehicle dynamics control, it is always necessary that it be possible to brake each vehicle wheel individually.

A pressure side of the additional pump communicates with the pressure side of the return pump; that is, when the switchover valve that hydraulically separates the master cylinder from the other components is closed, the additional pump feeds brake fluid to the wheel brake cylinders. The brake pressure built up with the additional pump is adjusted in a manner known per se for individual wheels to the instantaneously required value, with the brake pressure modulation valve assembly.

Another advantage of the invention is the safe, reliable hydraulic disconnection of the brake circuits. As is usual in conventional vehicle brake systems, the brake circuits are connected to a tandem or multicircuit master cylinder, which reliably assures the hydraulic separation of the brake circuits. Otherwise, there is no hydraulic component that is connected to two brake circuits and that in the event of a defect could make the brake circuits communicate hydraulically with one another.

BRIEF DESCRIPTION OF THE DRAWINGS

The invention will be described in further detail below in terms of two exemplary embodiments shown in the drawings.

DESCRIPTION OF THE FIRST EXEMPLARY EMBODIMENT

Figure 1:
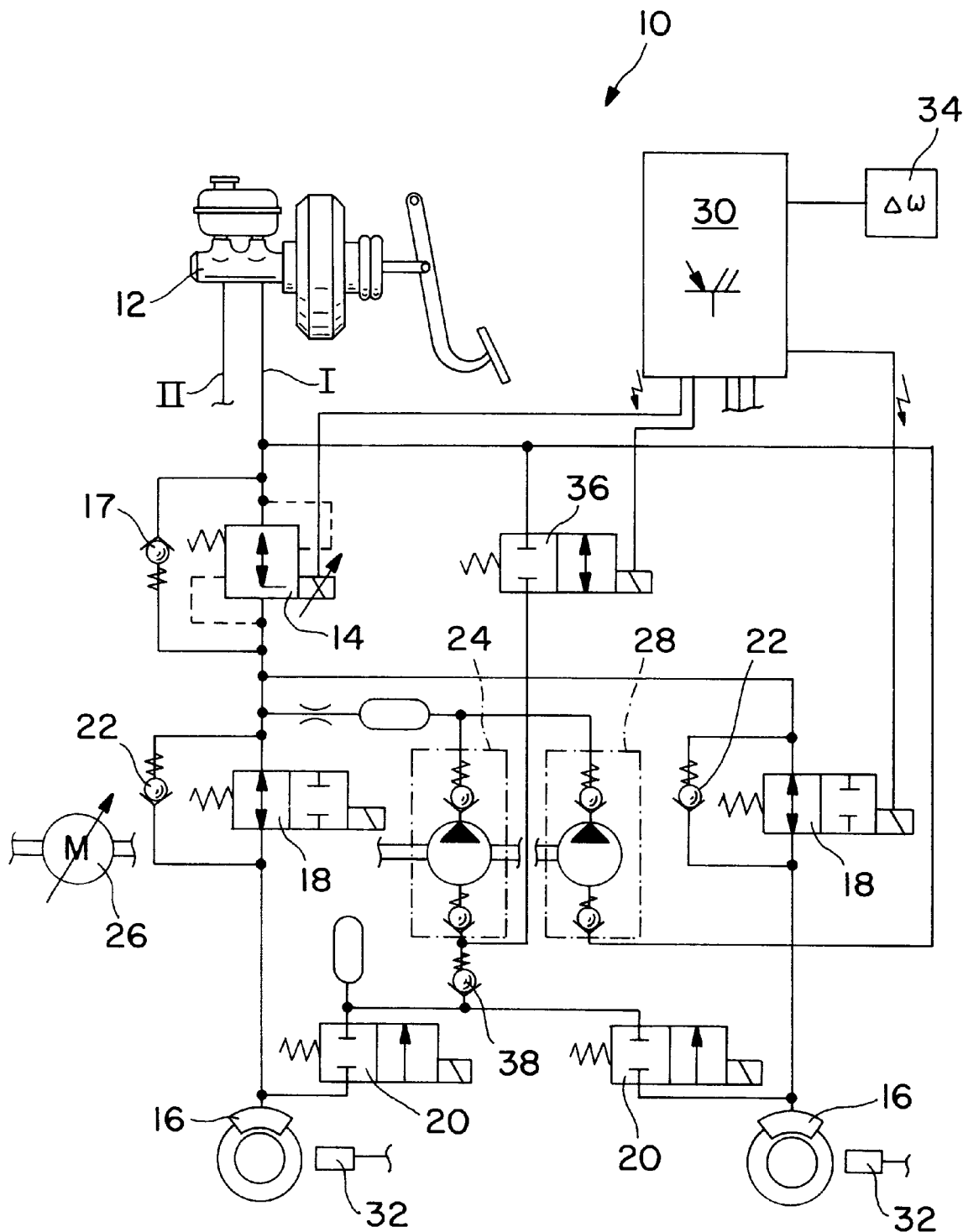
FIG. 1 is a hydraulic circuit diagram for a first embodiment of the invention.

The dual-circuit vehicle brake system 10 according to the invention, shown in FIG. 1, has a tandem master cylinder 12, to which two mutually independent brake circuits I, II are connected, of which only one brake circuit I is shown in the drawing. The brake circuit II not shown is identical in structure and functions in the same way.

The master cylinder 12 is followed by a switchover valve 14, to which a check valve 17, which allows a flow through it in the direction from the master cylinder 12 to wheel brake cylinders 16, is connected in parallel. The switchover valve 14 is embodied as a controllable differential pressure valve; that is, a pressure difference between the wheel brake cylinder side and the master cylinder side can be established, with the pressure higher on the wheel brake cylinder side. In the exemplary embodiment shown, the switchover valve 14 is a differential pressure proportional magnet valve. Each wheel brake cylinder 16 has a brake pressure buildup valve 18 and a brake pressure reduction valve 20 preceding wheel brake cylinder, acting as a brake pressure modulation valve assembly. The brake pressure buildup valve 18 is a 2/2-way magnet valve that is open in its basic position. Connected parallel to it is a check valve 22 which allows a flow through check value in the direction to the master cylinder 12. The brake pressure reduction valve 20 is a 2/2-way magnet valve that is closed in its basic position.

Via the brake pressure reduction valves 20, a common return pump 24 is connected by its intake side to the wheel brake cylinders 16. A pressure side of the return pump 24 communicates with the wheel brake cylinders 16 via the brake pressure buildup valves 18.

The drive of the return pump 24 is effected with an rpm-controllable electric pump motor 26, which drives the return pumps 24 of both brake circuits I, II. In addition, the pump motor 26 drives an additional pump 28 in each brake circuit I, II. The additional pump 28 is a high-pressure hydraulic pump like the return pump 24. It is in a position to buildup a brake pressure necessary for full braking. It is embodied as self-aspirating, while conversely the return pump 24 need not be embodied as self-aspirating.

An intake side of the additional pump 28 is connected directly, that is, without the interposition of hydraulic components, to the master cylinder 12. Its pressure side communicates both with the pressure side of the return pump 24 and, via the brake pressure buildup valves 18, with the wheel brake cylinders 16. For the anti-lock, traction control and vehicle dynamics control modes, the vehicle brake system 10 of the invention has an electronic control unit 30, which controls the magnet valves 14, 18, 20 and the pump motor 26. It receives signals both from wheel rotation sensors 32 and, for vehicle dynamics control, from a gyroscope 34.

The function of the vehicle brake system 10 according to the invention, shown in FIG. 1, is as follows: Conventional braking is done by actuating the master cylinder 12, without actuating any of the magnet valves 14, 18, 20 or turning on the pump motor 26. If a tendency to locking or slipping occurs at one of the vehicle wheels, or if the electronic control unit 30 by means of its gyroscope 34 finds that the vehicle is threatening to skid, then the pump motor 26 is turned on. An individual-wheel brake pressure regulation is effected in a manner known per se using the return pump 24, the brake pressure buildup valves 18, and the brake pressure reduction valves 20. The jointly driven additional pump 28 feeds additional brake fluid from the master cylinder 12 in the direction of the wheel brake cylinders 16, and as a result with the master cylinder 12 unactuated brake pressure is rapidly built up, and individual-wheel brake actuation can be effected quickly. The brake pressure is limited by controlling the switchover valve 14, embodied as a differential pressure valve, which when an opening pressure that is set by the electronic control unit 30 and can be varied at any time is reached, excess brake fluid volume can be made to flow away to the master cylinder 12.

In addition, the vehicle brake system 10 according to the invention, shown in FIG. 1, has an intake valve 36, by way of which the intake side of the return pump 24 is connected to the master cylinder 12. The intake valve 36 is a 2/2-way magnet valve that is closed in its basic position. The vehicle brake system 10 also has an additional check valve 38, which is connected between the intake side of the return pump 24 and the brake pressure reduction valves 20 and which allows a flow through it in the direction of the return pump 24. The additional check valve 38 prevents brake fluid, when the intake valve 36 is opened, from being able to flow out of the master cylinder 12 in the direction of the brake pressure reduction valves 20.

The intake valve 36 makes it possible with the return pump 24 as well to aspirate brake fluid from the master cylinder 12 in order to speed up the brake pressure buildup still further. The intake valve 36 and with it the additional check valve 38 are not necessarily required and can also be omitted, for the sake of a simpler structure of the vehicle brake system 10 of the invention.

Description of the Second Exemplary Embodiment

Figure 2:
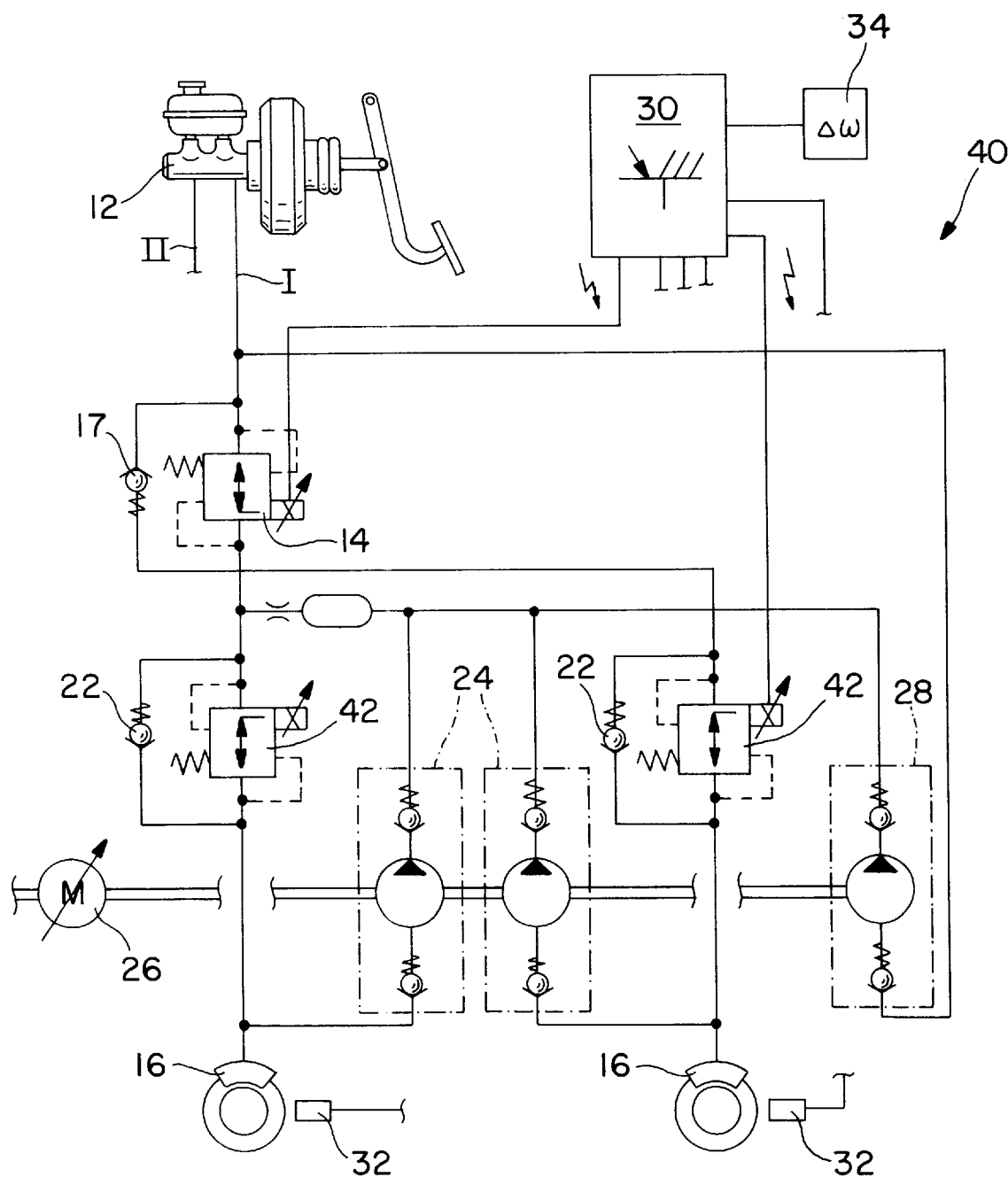
FIG. 2 is a hydraulic circuit diagram for a second embodiment of the invention.

To avoid repetition, the same reference numerals are used for corresponding components in FIGS. 1 and 2. The embodiment shown in FIG. 2 of a vehicle brake system 40 according to the invention has two mutually independent brake circuits I, II, which are connected to a tandem master cylinder 12. Only one brake circuit I is shown; the other brake circuit II is embodied identically and functions in the same way.

Once again, the master cylinder 12 is followed by a switchover valve 14 in the form of a controllable differential pressure proportional magnet valve, connected parallel to which is a check valve 17 that allows a flow in the direction from the master cylinder 12 to wheel brake cylinders 16.

Instead of the brake pressure modulation valve assembly 18, 20, a brake pressure control valve 42 is used, preceding each wheel brake cylinder 16. Like the switchover valve 14, the brake pressure control valve 42 is embodied as a controllable differential pressure proportional magnet valve, which is open in its basic position and with which a pressure difference can be established, by means of the electronic control unit 30, between a master cylinder side and a wheel brake cylinder side. The pressure on the master cylinder side is higher. Connected parallel to the brake pressure control valve 42 is a check valve 22 that allows a flow toward the master cylinder 12.

For each wheel brake cylinder 16, the vehicle brake system 40 has one return pump 24, whose intake side is connected to the wheel brake cylinder 16 without the interposition of a brake pressure reduction valve. The return pumps 24 can be driven with a common, variable-rpm electric pump drive motor 26, which also drives return pumps of brake circuit II, not shown. The pressure sides of the return pumps 24 communicate both with the wheel brake cylinders 16, via the brake pressure control valve 42, and with the master cylinder 12 via the switchover valve 14.

An additional pump 28 is connected by its intake side directly to the master cylinder 12. Its pressure side communicates with the pressure sides of the return pumps 24 and also, via the brake pressure control valves 42, with the wheel brake cylinders 16 and via the switchover valve 14 with the master cylinder 12. The additional pump 28 is driven jointly with the return pumps 24 by the pump motor 26.

The vehicle brake system 40 shown in FIG. 2, like the brake system 10 shown in FIG. 10, has an electronic control unit 30, wheel rotation sensors 32, and a gyroscope 34 for ascertaining any tendency on the part of the vehicle to skid.

The function of the vehicle brake system 40 according to the invention, shown in FIG. 2, is as follows: conventional braking is done by actuation of the master cylinder 12, without controlling the magnet valves 14, 42 and the pump motor 26. For anti-lock control, traction control and vehicle dynamics control, the pump motor 26 is turned on. As a result, the additional pump 28 feeds brake fluid from the master cylinder 12 to the brake pressure control valves 42, through which brake fluid flows to the wheel brake cylinders 16. The feed pumps 24 driven jointly with the additional pump 28 feed brake fluid emerging from the respective wheel brake cylinder 16, back to the brake pressure control valves 42; that is, the return pumps 24 feed in a circulatory loop, with the brake pressure in each wheel brake cylinder 16 being adjustable with the brake pressure control valve 42. The electronic control unit 30 controls the brake pressure control valves 40 in such a way that locking of the vehicle wheels during braking and slippage on startup or acceleration are averted, and it brakes the vehicle wheels individually in the vehicle dynamics control mode in such a way as to counteract any tendency to skidding on the part of the vehicle. With the additional pump 28, the brake pressure on the wheel brake cylinder side of the switchover valve 14 can be raised, and by controlling the switchover valve 14 in the direction of a lesser differential pressure, the brake pressure on the wheel brake cylinder side of the switchover valve 14 can be reduced.

The brake pressure buildup and brake pressure reduction valves 18, 20 that form the brake pressure modulation valve assembly in the vehicle brake system 10 shown in FIG. 1 can also be replaced by the brake pressure control valves 42 of the vehicle brake system 40 shown in FIG. 2, and conversely the brake pressure control valves 42 can be replaced by the brake pressure modulation valve assemblies 18, 20.

The two vehicle brake systems 10, 40 according to the invention shown in FIGS. 1 and 2 also allow braking of the vehicle independently of the actuation of the master cylinder 12 by turning on the pump motor 26 and actuating the magnet valves 14, 18, 20, 36, 42 as described above. As a result, for instance if a driver in an emergency braking situation fails to actuate the vehicle brake system 10, 40 strongly enough to brake with the maximum possible deceleration, the brake pressure in the wheel brake cylinders 16 can be increased enough to generate a maximum possible wheel braking moment, which is adjusted individually for each wheel with the brake pressure modulation valve assembly 18, 20 or the brake pressure control valve 42.

Figure 3:
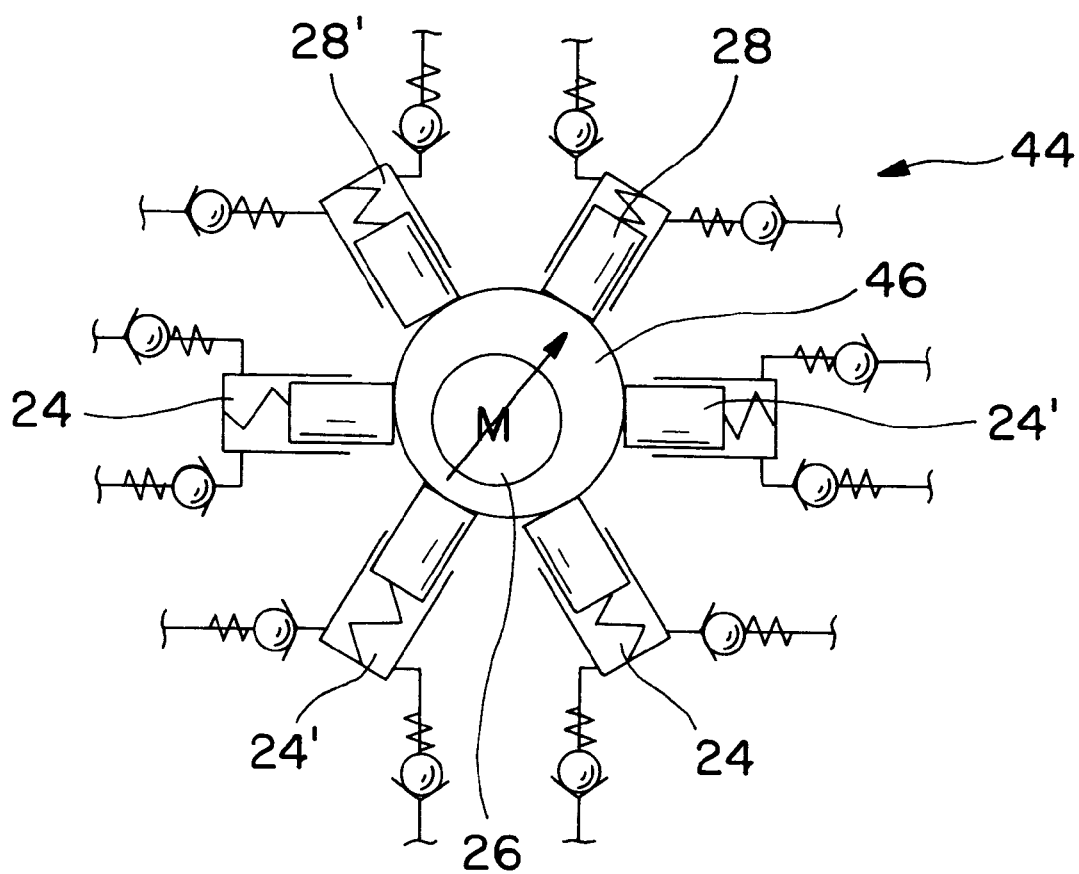
FIG. 3 is a schematic illustration of a pump unit for a vehicle brake system according to the invention.

The return pump or pumps 24 and the additional pump 28 may be part of a single common pump unit. Such a pump unit may for instance be embodied as a stepped piston pump, of the kind disclosed in U.S. Pat. No. 4,875,741. The piston pump disclosed there, having two double-stepped pistons, suffices for the vehicle brake system 10 according to the invention shown in FIG. 1. For the vehicle brake system 40 according to the invention shown in FIG. 2, a stepped piston pump with two triple-stepped or three double-stepped pistons would be required, and the three pistons can be disposed in a delta pattern. Another exemplary embodiment of a pump unit 44 that has the return pumps 24 and the additional pumps 28 of both brake circuits I, II is schematically shown in FIG. 3. The pump unit 44 has a variable-rpm electric pump motor 26, with which an eccentric element 46 can be driven to rotate. Arranged in a delta pattern and radially around the eccentric element 46 are six piston pumps 24, 24', 28, 28'. Such pump units, although with only two piston pumps disposed opposite one another, are known per se as return pump units for dual-circuit vehicle brake systems with anti-lock braking.

By means of the angularly offset disposition of the piston pumps 24, 24', 28, 28' around the eccentric element 46, the piston pumps are driven at a constant phase displacement from one another, and as a result the feed stream of the three piston pumps 24, 28; 24', 28' of one brake circuit I; II is made uniform. Any pressure pulsation and thus noise production is reduced considerably. Preferably, the three piston pumps 24, 28 of one brake circuit I, as shown in FIG. 3, are offset by 120° from one another, while the piston pumps 24', 28' of the other brake circuit II are disposed between them, offset by 60° from one another. For the vehicle brake system 10 shown in FIG. 1, a pump unit 44 according to FIG. 3 but with only four piston pumps 24, 24', 28, 28' offset by 90° from each other would be sufficient.

The foregoing relates to a preferred exemplary embodiment of the invention, it being understood that other variants and embodiments thereof are possible within the spirit and scope of the invention, the latter being defined by the appended claims.

We claim:

1. A hydraulic vehicle brake system with an arrangement for slip control and/or a vehicle dynamics control, comprising at least two brake circuits, having a tandem or multicircuit master cylinder (12), a switch over valve (14) embodied as a controllable differential pressure valve in each brake circuit that follows the master cylinder, at least one wheel brake cylinder (16) in each brake circuit, a brake pressure modulation valve assembly (20) for each wheel brake cylinder, a return pump (24) in each brake circuit, with which brake fluid that has flowed out of the wheel brake cylinders is fed in a direction of the master cylinder via said switch over valve (14) or back to the wheel brake cylinders via a brake pressure buildup valve (18), the vehicle brake system (10:40) has an additional pump (28) in each brake circuit (I, II), with an intake side connected to the master cylinder (12) and the wheel brake cylinders (16) of said brake circuit (I, II) are connected via the brake pressure modulation valve assembly 20 via said return pump (24) to a pressure side of said additional pump (28), and the intake side of the return pump (24) is connected to the master cylinder (12) via an intake valve (36).

2. The vehicle brake system according to claim 1, in which the vehicle brake system (10; 40) has a multichamber piston pump, which forms the return pumps (24) and the additional pumps (28).

3. The vehicle brake system according to claim 2, in which the multichamber piston pump is embodied as a stepped piston pump unit.

4. The vehicle brake system according to claim 2, in which the multichamber piston pump is embodied as a radial piston pump unit (44).

5. A hydraulic vehicle brake system with an arrangement for slip control and/or a vehicle dynamics control, comprising at least two brake circuits, having a tandem or multicircuit master cylinder (12), a switch over valve (14) embodied as a controllable differential pressure valve in each brake circuit that follows the master cylinder, at least one wheel brake cylinder (16) in each brake circuit, a brake pressure modulation valve assembly (20) for each wheel brake cylinder, a return pump (24) for each wheel brake cylinder in each brake circuit, with which brake fluid that has flowed out each wheel brake cylinders is fed in a direction of the master cylinder via each of said return via each of said return pumps or back to the wheel brake cylinders via a brake pressure control valve (42) for each brake cylinder, the vehicle brake system (10; 40)has an additional pump (28) in each brake circuit (I,II), with an intake side connected to the master cylinder (12) and via said brake pressure control valves (42) to each of said wheel brake cylinders (16) of said brake circuit (I,II) which are connected to a pressure side of each of said return pumps (24).

6. The vehicle brake system according to claim 5, in which the vehicle brake system (10; 40) has a multichamber piston pump, which forms the return pumps (24) and the additional pumps (28).

7. The vehicle brake system according to claim 6, in which the multichamber piston pump is embodied as a stepped piston pump unit.

8. The vehicle brake system according to claim 6, in which the multichamber piston pump is embodied as a radial piston pump unit (44).

* * * * *